(12) United States Patent
Simpson et al.

(10) Patent No.: US 6,959,969 B2
(45) Date of Patent: Nov. 1, 2005

(54) SYSTEM AND METHOD FOR CONTROLLING A BRAKE

(75) Inventors: Melinda D. Simpson, Jamestown, OH (US); Jon T. Zumberge, Centerville, OH (US); Robert J. Disser, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/794,998

(22) Filed: Mar. 5, 2004

(65) Prior Publication Data

US 2005/0194836 A1 Sep. 8, 2005

(51) Int. Cl.[7] .............................................. B60T 8/00
(52) U.S. Cl. .................... 303/20; 188/162; 188/1.11 E; 188/158
(58) Field of Search ................................ 188/156, 157, 188/158, 161, 162, 1.11 E, 1.11 R, 71.7, 188/71.8, 1.11 L, 72.1, 72.8; 303/20, 115.2, 303/155; 318/139, 375, 376, 371; 700/28, 700/37; 701/70, 80

(56) References Cited

U.S. PATENT DOCUMENTS

| | | | |
|---|---|---|---|
| 6,279,694 B1 | 8/2001 | Bohm et al. | |
| 6,422,659 B2 * | 7/2002 | Disser | 303/20 |
| 6,464,308 B2 | 10/2002 | Kubota | |
| 6,536,562 B1 | 3/2003 | Bohm et al. | |
| 2001/0030462 A1 * | 10/2001 | Disser | 303/20 |

* cited by examiner

Primary Examiner—Douglas C. Butler
(74) Attorney, Agent, or Firm—Michael D. Smith

(57) ABSTRACT

A method for detecting a contact point of a brake mechanism. The brake mechanism includes an actuator controlled by a motor. The method includes the steps of establishing a parameter of the motor and a derivative of the parameter and, if the parameter has passed a previous value under no load conditions and the amplitude of the derivative of the parameter has passed a predetermined threshold, responsively establishing a zero position of the motor.

22 Claims, 3 Drawing Sheets

SYSTEM AND METHOD FOR CONTROLLING A BRAKE

FIELD OF THE INVENTION

The present application relates generally to brake systems, and more particularly, to method, apparatus, and program product for controlling a brake.

BACKGROUND OF THE INVENTION

Many vehicle designs utilize disc brakes and/or drum brakes. For example, typical parking brake configurations continuously employ regular drum brakes on a rear wheel. Parking brakes commonly rely on simple mechanical linkage to engage the brakes. The driver may simply pull a lever which is coupled to a brake cable which actuates the brakes. To release the brake, a button is pressed while lifting and releasing the lever. For these types of parking brakes, there may be a relatively large amount of "play" in the brake cable, i.e., a relatively large range of motion of the lever and brake cable may be required in order to supply sufficient braking force to retain the vehicle in place. This is generally satisfactory, since the drive may simply lift the lever until sufficient force has been applied.

However, in some systems, the parking brake or other brake is engaged electronically. The driver may simply depress a pedal, lever, button or other suitable means, which sends a signal to a controller or actuator which engages the brake.

In these type of systems, since the brake is automatically actuated, it is important to know when a target force is being applied to the wheel(s), such that the vehicle is retained in its current position. Some systems accomplish this by using a force sensor which measure the force being applied by the brake. The brake or brake actuator may therefore be controlled using closed loop forced feedback.

However, such sensors add cost to the system. And harsh environmental factors, such as temperature variation and moisture, reduce the reliability and accuracy of the sensors. Additional circuitry may be used to compensate for the drift and sensitivity variations caused by the factors, however, this again adds cost and complexity to the system.

One system aimed at detecting a contact point of a brake is discloses in U.S. Pat. No. 6,279,694 issued Aug. 28, 2001 to Jürgen Böhm et al. and assigned to ITT Manufacturing Enterprises Inc. The '694 patent discloses a system for adjusting a brake based on sensed position. However, there are two inherent problems with the Böhm system. First, it only detects the contact position during an apply mode. Second, the system returns erroneous results when initiated and the brake is already being applied.

The present invention is aimed at one or more of the problems identified above.

SUMMARY OF THE INVENTION

In a first aspect of the present invention, a method for detecting a contact point of a mechanism is provided. The mechanism includes an actuator controlled by a motor. The method includes the steps of establishing a parameter of the motor and a derivative of the parameter and, if the parameter has passed a previous value under no load conditions and the amplitude of the derivative of the parameter has passed a predetermined threshold, responsively establishing a zero position of the motor.

In a second aspect of the present invention, a method for detecting a contact point of a mechanism, is provided. The mechanism includes an actuator controlled by a motor. The method includes the steps of establishing a speed of the motor and an acceleration of the motor as a function of the motor speed and, if the motor speed has passed a previous motor speed and the amplitude of the acceleration has passed a predetermined threshold, responsively establishing a zero position of the motor.

In a third aspect of the present invention, a method for controlling a mechanism, is provided. The mechanism includes an actuator controlled by a motor. The method includes the steps of establishing a speed of the motor and an acceleration of the motor as a function of the motor speed, responsively establishing a zero position of the motor if the motor speed has passed a previous motor speed and the amplitude of the acceleration has passed a predetermined threshold, and controlling the brake mechanism using an position based control function.

In a fourth aspect of the present invention, a method for detecting a contact point of a brake mechanism, is provided. The mechanism includes an actuator controlled by a motor. The method includes the steps of establishing an electric current applied to the motor and a derivative of the electric current and, if the electric current has passed a previous electric current and the amplitude of the derivative of the electric current has passed a predetermined threshold, responsively establishing a zero position of the motor.

In a fifth aspect of the present invention, a method for controlling a mechanism, is provided. The mechanism includes an actuator controlled by a motor. The method includes the steps of establishing an electric current applied to the motor and a derivative of the electric current, responsively establishing a zero position of the motor, if the electric current has passed a previous electric current and the amplitude of the derivative of the electric current has passed a predetermined threshold, and controlling the mechanism using a position based control function.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
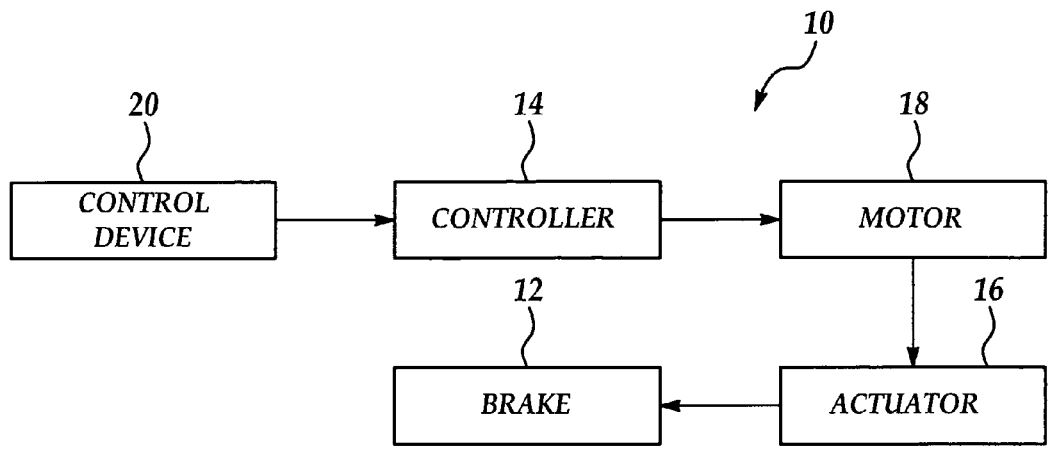
FIG. 1 is a block diagram that illustrates a brake system environment consistent with the principles of the present invention.

The block diagram of FIG. 1 illustrates a mechanism 10, such as a brake mechanism, that is consistent with the principles of the present invention. In the illustrated embodiment, the mechanism 10 employs position control functions to regulate the actuation and release of a brake 12. Generally, a controller 14 may execute a combined load/position algorithm configured to control the movement of an actuator 16. The actuator 16 is coupled to the brake 12 and may be configured to selectively actuate and release brake 12 in response to a command or command signals. The brake 12 is operable to restrict movement of a vehicle (not shown). As such, the travel of the actuator 14 causes a force to be transferred to the brake 12.

The algorithm controlling the movement of the actuator 16 includes calibration and diagnostic routines which may account for variations within the brake mechanism 10 and for determining when a contact condition exists within the brake 12.

In one embodiment, the brake 12 is a disc brake which is directly coupled to the actuator 16. As such, the travel of the actuator 16 causes a force to be transferred directly to the brake 12.

An operator may initiate actuation or release of the brake 12 through actuation of a control device 20, such as a button and/or lever. The control device 20 may transmit an actuation and/or release signal to the controller 14. The controller 14 may include a computer, central processing unit, microprocessor or other suitable control device.

In one embodiment, the controller 14, in response to the actuation and/or release signal, may initiate processing of a position feedback control program (or program product) resident in the controller 14. The program may instruct the controller 14 to transmit a command to a motor 18 in the actuator 16. In addition to the motor 18, the actuator 16 may incorporate a position sensor, a power screw and a gear set (not shown) for gaining mechanical advantage. In response to the command, the actuator 16 may travel in directions along an axis of the actuator 16. Alternatively, it will be appreciated that movement of the actuator 16 may occur in any direction corresponding to an increase or decrease of brake force. This movement of the actuator 16 is accomplished according to a position feedback control program.

In the illustrated embodiment, the position feedback control program requires is based on a home position, i.e., the zero force or drag position, at which no force is exerted by the brake 12. In one aspect of the present invention, the controller 14 implements a calibration routine under power-up, e.g., when the vehicle's engine is started. The calibration routine is aimed at determining the zero force or drag position of the actuator 16. In the illustrated embodiment, this zero force position is defined in terms of a (rotary) motor position within the actuator 16. For example, the rotary motor position may be defined in terms of turns (counts) of the motor 18.

Figure 4:
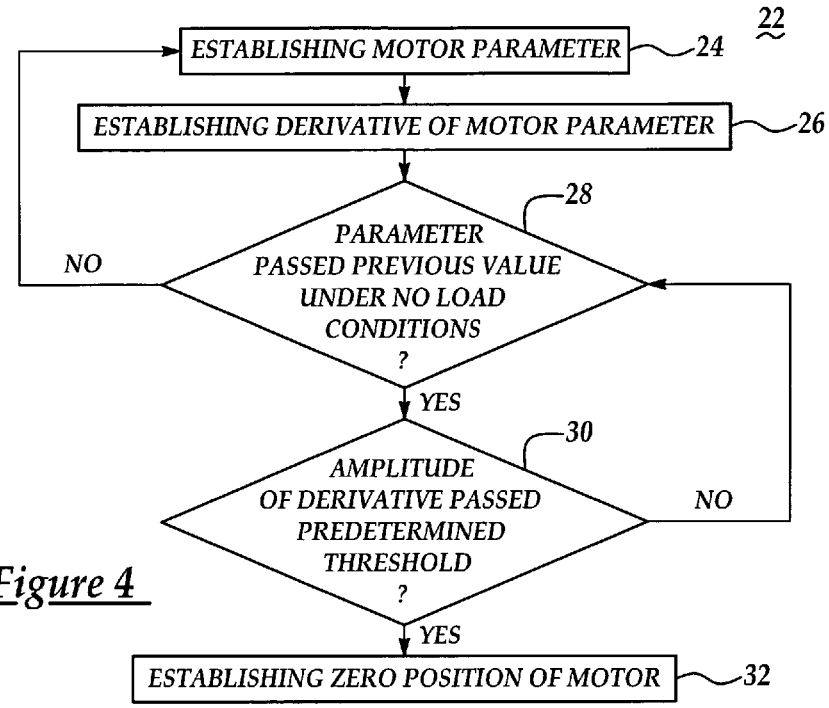
FIG. 4 is a flowchart of a first method for detecting a contact position of the brake system of FIG. 1, according to an embodiment of the present invention.

With specific reference to FIG. 4, in one embodiment of the present invention, a method 22 for detecting a contact point of the brake mechanism 10 based on a parameter of the motor 18 is provided. In a first step 24, the parameter of the motor 18 is established. As discussed below, the parameter of the motor may be sensed by a sensor (not shown) or determined as a function of another sensed or known value.

In a second step 26, a derivative of the parameter is determined. In a first decision block 28, if the parameter has passed a previous value of the parameter under no load conditions, then control proceeds to a second decision block 30. This ensures that the brake is not already in contact. Otherwise the method 22 returns to the first step 24. In the second decision block 30, if the amplitude of the derivative of the parameter has passed a predetermined threshold, then control proceeds to a third step 32. Otherwise, the method 22 returns to the first decision block 28. In the third step 32, a zero position of the motor 18 is established.

As discussed more fully in depth below, in one embodiment of the present invention, the parameter is motor speed. In another embodiment of the present invention, the parameter is electrical current supplied to the motor 18.

Figure 5:
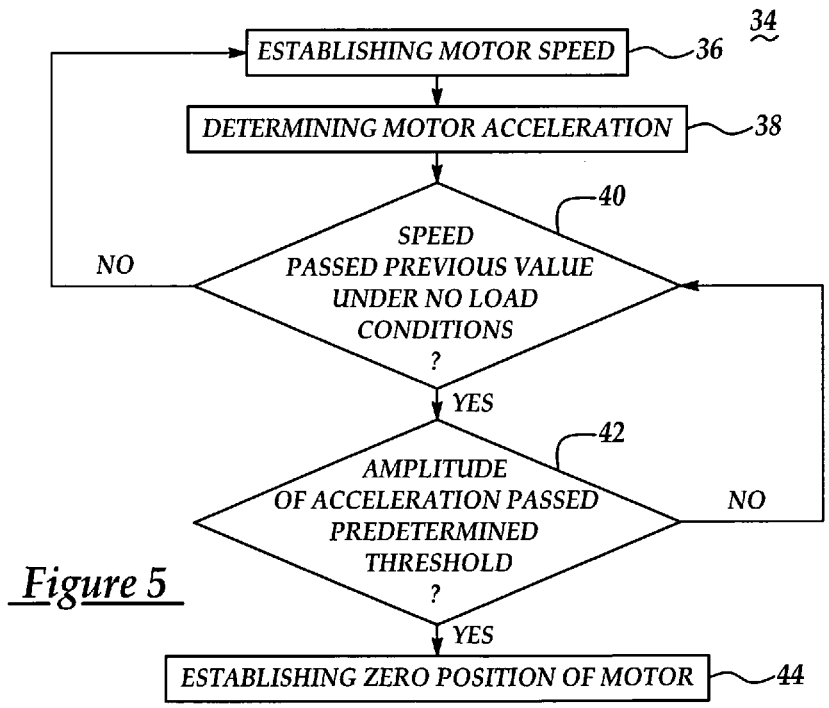
FIG. 5 is a flowchart of a second method for detecting a contact position of the brake system of FIG. 1, according to another embodiment of the present invention; and, FIG. 6 is a flowchart of a third method for detecting a contact position of the brake system of FIG. 1, according to still another embodiment of the present invention.

With reference to FIG. 5, in another aspect of the present invention, a method 34 for detecting a contact position of the brake mechanism 10 based on motor speed is provided. In one embodiment, the method 22 is performed during an apply mode of the brake mechanism 10. This is shown in FIG. 4. Alternately or additionally, the method 22 may be performed during a release mode of the brake mechanism 10. To apply the method 22 in the release mode, the order of steps 28 and 30 are reversed. The method 22 may also be performed during an initialization of the brake mechanism 10.

Under a no-load condition, the actuator 16 can achieve a constant speed. Once a load has been applied to the brake 12, i.e., contact, motor speed will decrease.

In a first step 36, motor speed is established. Motor speed may be determined as a function of sensed motor position. In one embodiment, motor position is filtered with a single low pass filter. An unfiltered motor speed value may then be determining by subtracting a previous motor position value from the filtered motor position value. The unfiltered motor speed value may then be filtered using a second single pole low pass filter.

In a second step 38, motor acceleration is established. In one embodiment, an unfiltered motor acceleration value is determined by subtracting a previous filtered motor speed value from the current filtered motor speed value. The unfiltered motor acceleration value may then be filtered using a single pole low pass filter.

It should, be noted, however, that the above filtering scheme is for exemplary purposes only. The present invention is not limited to any filtering scheme.

In a first decision block 40, the current filtered motor speed is compared against a motor speed value under no load conditions during the previous release mode. If the current filtered motor speed value has passed the previous motor speed value, then the method 34 proceeds to a second decision block 42. Otherwise, the method 34 returns to the first step 36.

If the current motor speed is less than the previous motor speed value, then the brake mechanism 10 may already be in contact, i.e., brake force already being applied. If so, then the method returns to the first step 36.

In the second decision block 42, contact is detected. If the amplitude of motor speed acceleration has passed a predetermined threshold, then the method 34 proceeds to a third step 44. Otherwise, the method 34 returns to the first decision block 40. In one example, the method 34 is being applied during the apply mode. If the acceleration is below the predetermined threshold, than contact has occurred.

In the third step 44, the zero or home position of the motor 18 is established. In one embodiment, the zero position of the motor is determined as a function of an established position of the motor when the amplitude of the acceleration has passed the predetermined threshold.

As discussed above, the method 34 may include the step of applying at least one filter to one of the motor position and the motor speed. In one embodiment, the zero position of the motor is determined by subtracting the motor speed multiplied by a lag time associated with the at least one filter from the established position.

In another aspect of the present invention, the method 34, may also include the step of filtering the zero position with previously determined zero positions and responsively establishing a filtered zero position.

In one embodiment, the method 34 is performed during an apply mode of the brake mechanism 10. This is shown in FIG. 4. Alternately or additionally, the method 34 may be performed during a release mode of the brake mechanism 10. To apply the method 34 in the release mode, the order of steps 40 and 42 are reversed. The method 34 may also be performed during an initialization of the brake mechanism 10.

Figure 6:
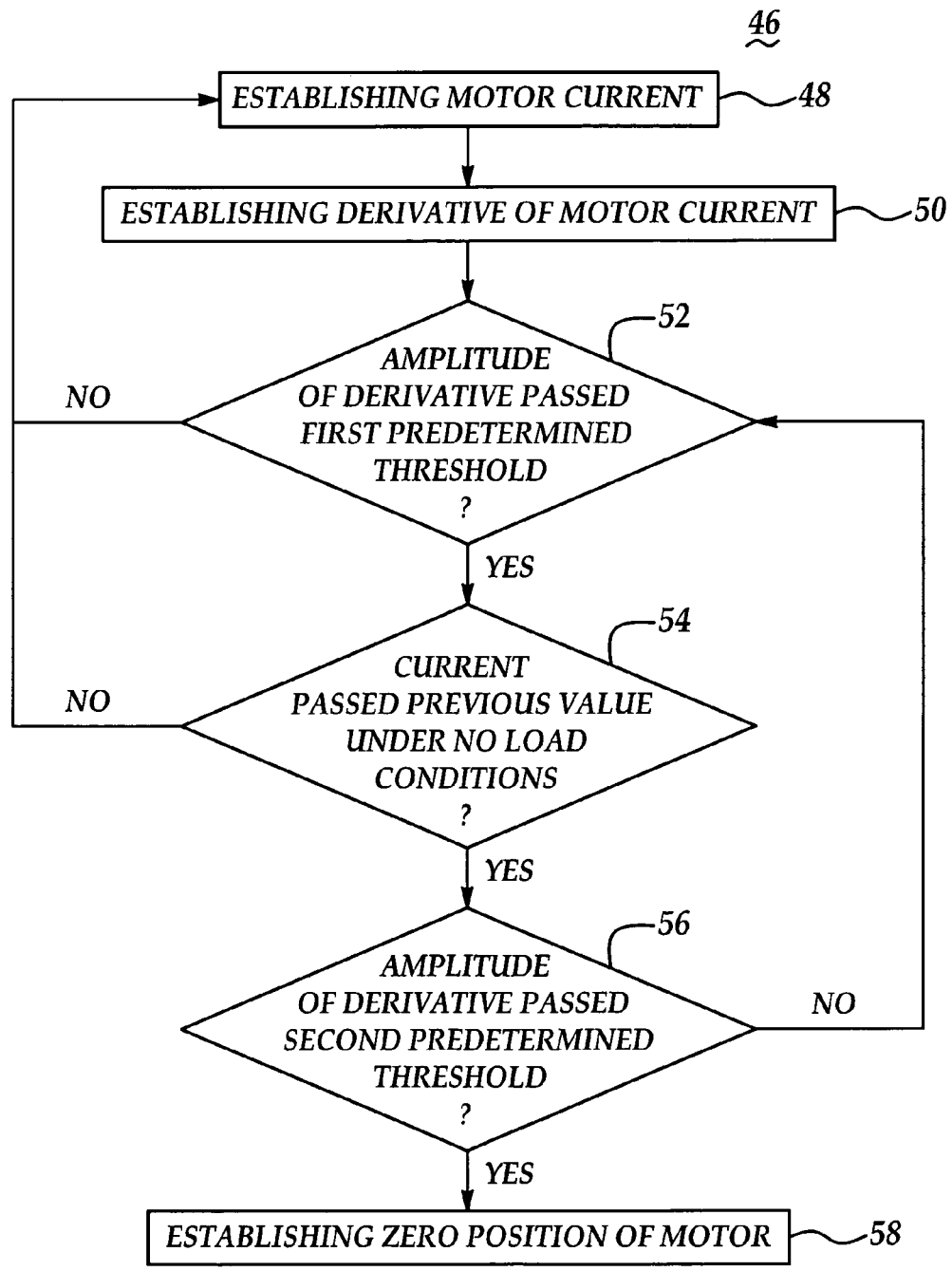

With reference to FIG. 6, in another aspect of the present invention, a method 46 for detecting a contact position of the brake mechanism 10 based on electric current supplied to the motor is provided. In one embodiment, the method 34 is performed during an apply mode of the brake mechanism 10. Alternately or additionally, the method 46 may be performed during a release mode of the brake mechanism 10. The method 46 may also be performed during an initialization of the brake mechanism 10.

Under a no-load condition, the actuator 16 maintains a relatively constant motor current. Once a load has been applied to the brake 12, i.e., contact, motor current will increase.

In a first step 48, motor current is established through measurement of a current sensing element (not shown). In one embodiment, motor current is filtered with a tenth order average filter.

In a second step 50 a derivative of motor current is established. In one embodiment, the derivative of motor current is calculated using the formula:

(2×current$_{new}$)−(2×current$_2$)+current$_1$−current$_3$, where current$_{new}$ is the new value of the filtered motor current, current$_1$ is the previous value of the motor current, current$_2$ is the value of the motor current before current, and current$_3$ is the value of the motor current before current$_2$.

The resulting value may then be filtered using a single pole low pass filter. Value. It should be noted, however, that the above filtering scheme is for exemplary purposes only. The present invention is not limited to any filtering scheme.

Figure 2:
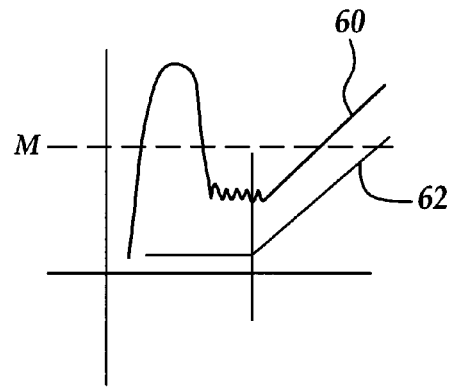
FIG. 2 is a graph representing motor current and force on the actuator of FIG. 1 versus displacement of the actuator.
Figure 3:
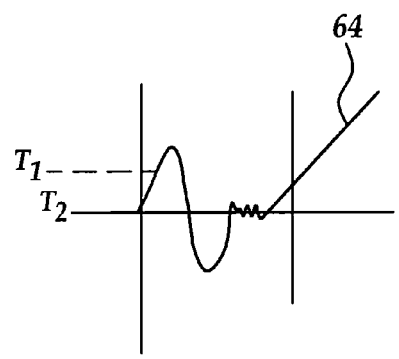
FIG. 3 is a graph representing the derivative of motor current versus displacement of the actuator.

With particular reference to FIGS. 2 and 3, exemplary illustrations showing the behavior of motor current 60, brake force 62 and the derivative of motor current 64 during a typical brake apply is shown. As the brake mechanism 10 transfers from an idle state (current equals zero) to the brake apply mode, the motor current ramps up until the actuator 16 achieves a constant velocity. Then motor current begins to decrease. This slowing state of the actuator 16 may be detected by comparing the amplitude of the motor current derivative with a first predetermined threshold ($T_1$). Once the motor current derivative is less than the first predetermined threshold, the method 46 proceeds to a second decision block 54. As discussed below, when load is being applied by the brake mechanism 10, i.e., contact, motor current and the derivative of the motor current will begin to increase again. Contact is detected once the motor current derivative increases past a second threshold ($T_2$).

First, however, in a second decision block 54, the amplitude of the motor current is compared with a previous motor current value under no load conditions during the previous release mode. If the current filtered motor current has passed the previous motor current value, then the method 54 proceeds to a third decision block 56. Otherwise, the method 46 returns to the first step 48.

If the current motor current is greater than the previous motor current value, then the brake mechanism 10 may already be in contact, i.e., brake force already being applied. If so, then the method returns to the first step 48.

In the third decision block 56, contact is detected. If the amplitude of derivative of motor current has passed the third predetermined threshold, then the method 46 proceeds to a third step 58. Otherwise, the method 46 returns to the first decision block 52. In one example, the method 46 is being applied during the apply mode. If the derivative of motor current is greater than the third predetermined threshold, than contact has occurred.

In the third step 58, the zero or home position of the motor 18 is established. In one embodiment, the zero position of the motor is determined as a function of an established position of the motor 18 when the derivative of motor current has passed the third predetermined threshold.

As discussed above, the method 56 may include the step of applying at least one filter to one of the motor current and/or its derivative. In one embodiment, the zero position of the motor is determined by subtracting the motor speed multiplied by a lag time associated with the at least one filter from the established position.

In another aspect of the present invention, the method 56, may also include the step of filtering the zero position with previously determined zero positions and responsively establishing a filtered zero position.

In one embodiment, the method 46 is performed during an apply mode of the brake mechanism 10. This is shown in FIG. 6. Alternately or additionally, the method 46 may be performed during a release mode of the brake mechanism 10. To perform during the release mode, step 54 is performed after step 56.

Obviously, many modifications and variations of the present invention are possible in light of the above teachings. The invention may be practiced otherwise than as specifically described within the scope of the appended claims.

What is claimed is:

1. A method for detecting a contact point of a mechanism, the mechanism having an actuator controlled by a motor, including the steps of:
   (a) establishing a parameter of the motor;
   (b) establishing a derivative of the parameter;
   (c) determining if the parameter has passed a previous value of the parameter under no load conditions;
   (d) determining if an amplitude of the derivative of the parameter has passed a predetermined threshold; and,
   (e) if the parameter has passed the previous value under no load conditions and the amplitude of the derivative of the parameter has passed the predetermined threshold, responsively establishing a zero position of the motor.

2. A method, as set forth in claim 1, the parameter being one of motor speed and electrical current supplied to the motor.

3. A method, as set forth in claim 1, wherein step (d) is performed before step (c).

4. A method for detecting a contact point of a mechanism, the mechanism having an actuator controlled by a motor, including the steps of:

(a) establishing a speed of the motor;
(b) establishing an acceleration of the motor as a function of the motor speed;
(c) determining if the motor speed has passed a previous motor speed under no load conditions;
(d) determining if an amplitude of the acceleration has passed a predetermined threshold; and,
(e) if the motor speed has passed the previous motor speed and the amplitude of the acceleration has passed the predetermined threshold, responsively establishing a zero position of the motor.

5. A method, as set forth in claim 4, wherein the zero position of the motor is determined as a function of an established position of the motor when the amplitude of the acceleration has passed the predetermined threshold.

6. A method, as set forth in claim 4, including the steps of:
determining a position of the motor; and,
subtracting a previous motor position from the motor position to determine motor speed.

7. A method, as set forth in claim 6, including the step of applying at least one filter to one of the motor position and the motor speed.

8. A method, as set forth in claim 7, wherein the zero position of the motor is determined by subtracting the motor speed multiplied by a lag time associated with the at least one filter from the established position.

9. A method, as set forth in claim 4, including the step of filtering the zero position with previously determined zero positions and responsively establishing a filtered zero position.

10. A method, as set forth in claim 4, the mechanism having a release mode and an apply mode, the method being performed during one of the release mode and the apply mode.

11. A method, as set forth in claim 10, wherein step (d) is performed before step (c) when the method is performed in the release mode.

12. A method, as set forth in claim 4, the method being performed daring initialization of the mechanism.

13. A method controlling a mechanism, the mechanism having an actuator controlled by a motor, including the steps of:
establishing a speed of the motor;
establishing an acceleration of the motor as a function of the motor speed;
determining if the motor speed has passed a previous motor speed under no load conditions;
determining if an amplitude of the acceleration has passed a predetermined threshold;
if the motor speed has passed the previous motor speed and the amplitude of the acceleration has passed the predetermined threshold, responsively establishing a zero position of the motor; and,
controlling the mechanism using a position based control function.

14. A method for detecting a contact point of a mechanism, the mechanism having an actuator controlled by a motor, including the steps of:
establishing an electric current applied to the motor;
determining a derivative of the motor current;
determining if an amplitude of the derivative of the motor current has passed a first predetermined threshold in a first direction;
determining if the motor current passes a previous motor current under no load conditions;
determining if an amplitude of the derivative of the motor current has passed a second predetermined threshold in a second direction; and,
if the motor current passes the previous motor current and the amplitude of the derivative of the motor current has passed the first predetermined threshold in the first direction and, subsequently, the second predetermined threshold in the second direction, responsively establishing a zero position of the motor.

15. A method, as set forth in claim 14, wherein the zero position of the motor is determined as a function of an established position of the motor when the amplitude of the derivative of the motor current passes the second predetermined threshold.

16. A method, as set forth in claim 15, including the stop of applying at least one filter to one of the motor position and the motor speed.

17. A method, as set forth in claim 16, wherein the zero position of the motor is determined by subtracting the motor speed multiplied by a lag time associated with the at least one filter from the established position.

18. A method, as set forth in claim 14, including the step of filtering the zero position with previously determined zero positions and responsively establishing a filtered zero position.

19. A method, as set forth in claim 14, the mechanism having a release mode and an apply mode, the method being performed during one of the release mode and the apply mode.

20. A method, as set forth in claim 19, wherein step (d) is performed before step (c) when the method is performed in the release mode.

21. A method, as set forth in claim 14, the method being performed during initialization of the mechanism.

22. A method controlling a mechanism, the mechanism having an actuator controlled by a motor, including the steps of:
establishing an electric current applied to the motor;
determining a derivative of the motor current;
determining if an amplitude of the derivative of the motor current has passed a first predetermined threshold in a first direction;
determining if the motor current passes a previous motor current under no load conditions;
determining if an amplitude of the derivative of the motor current has passed a second predetermined threshold in a second direction;
if the motor current passes the previous motor current and the amplitude of the derivative of the motor current has passed the first predetermined threshold in the first direction and, subsequently, the second predetermined threshold in the second direction, responsively establishing a zero position of the motor; and,
controlling the mechanism using a position based control function.

* * * * *